(12) United States Patent
Yamada

(10) Patent No.: US 9,490,669 B2
(45) Date of Patent: Nov. 8, 2016

(54) ROTOR AND MOTOR

(71) Applicant: ASMO CO., LTD., Shizuoka-ken (JP)

(72) Inventor: Yoji Yamada, Hamamatsu (JP)

(73) Assignee: ASMO CO., LTD., Shizouka-ken (JP)

( * ) Notice: Subject to any disclaimer, the term of this patent is extended or adjusted under 35 U.S.C. 154(b) by 551 days.

(21) Appl. No.: 13/966,020

(22) Filed: Aug. 13, 2013

(65) Prior Publication Data

US 2014/0049132 A1 Feb. 20, 2014

(30) Foreign Application Priority Data

Aug. 20, 2012 (JP) .................................. 2012-181635
Aug. 20, 2012 (JP) .................................. 2012-181636

(51) Int. Cl.
*H02K 1/24* (2006.01)
*H02K 1/27* (2006.01)
*H02K 21/04* (2006.01)

(52) U.S. Cl.
CPC ............ *H02K 1/243* (2013.01); *H02K 1/2706* (2013.01); *H02K 1/2766* (2013.01); *H02K 1/2713* (2013.01); *H02K 21/044* (2013.01)

(58) Field of Classification Search
CPC ... H02K 1/243; H02K 1/2713; H02K 21/044
See application file for complete search history.

(56) References Cited

U.S. PATENT DOCUMENTS

| | | | |
|---|---|---|---|
| 2,802,959 A | 8/1957 | Powers | |
| 3,206,623 A | 9/1965 | Snowdon | |
| 3,646,376 A * | 2/1972 | Anderson | ............... G01P 3/465 310/156.64 |
| 5,258,735 A * | 11/1993 | Allwine, Jr. | ............. G01B 7/30 335/302 |
| 5,483,116 A | 1/1996 | Kusase et al. | |
| 5,502,424 A * | 3/1996 | Kato | ..................... H01F 13/003 335/284 |
| 5,780,953 A * | 7/1998 | Umeda | ................. H02J 7/1492 310/263 |
| 5,903,084 A | 5/1999 | Asao et al. | |
| 5,925,964 A | 7/1999 | Kusase et al. | |
| 6,002,194 A | 12/1999 | Asao | |
| 6,013,967 A | 1/2000 | Ragaly et al. | |

(Continued)

FOREIGN PATENT DOCUMENTS

| | | |
|---|---|---|
| CN | 1289472 A | 3/2001 |
| CN | 1842955 A | 10/2006 |

(Continued)

OTHER PUBLICATIONS

Japanese Office Action of JP 2012-181637 dated Jan. 14, 2016 with its English Translation.

(Continued)

*Primary Examiner* — Dang Le
(74) *Attorney, Agent, or Firm* — Christensen Fonder, P.A.

(57) ABSTRACT

A rotor includes a first rotor core, a second rotor core, a field magnet, and a back magnet. The first rotor core includes a disk-shaped first core base and a plurality of first claw-poles. The second rotor core includes a disk-shaped second core base and a plurality of second claw-poles. The field magnet has the first claw-poles function as first magnetic poles and the second claw-poles function as second magnetic poles. The back magnet is arranged along back surfaces of the first and second claw-poles. The back magnet is magnetized such that radially outer sections have the polarities that are the same as the first and second magnetic poles. The back magnet is formed integrally, has an annular shape, and is in contact with all of the back surfaces of the first and second claw-poles.

5 Claims, 10 Drawing Sheets

(56) References Cited

U.S. PATENT DOCUMENTS

| | | | |
|---|---|---|---|
| 6,013,968 A | 1/2000 | Lechner et al. | |
| 6,104,118 A | 8/2000 | Kanazawa et al. | |
| 6,157,111 A | 12/2000 | Asao | |
| 6,201,335 B1 | 3/2001 | Higashino et al. | |
| 6,229,239 B1 * | 5/2001 | Lucidarme | H02K 1/2706 310/156.53 |
| 6,311,383 B1 | 11/2001 | Umeda et al. | |
| 6,424,072 B1 | 7/2002 | Armiroli et al. | |
| 6,426,581 B1 | 7/2002 | York et al. | |
| 6,455,978 B1 | 9/2002 | Krefta et al. | |
| 6,720,703 B1 | 4/2004 | Braun et al. | |
| 6,853,111 B2 | 2/2005 | Umeda et al. | |
| 7,288,862 B2 * | 10/2007 | Song | H02K 33/16 310/12.24 |
| 7,919,900 B2 | 4/2011 | Kusase | |
| 7,969,057 B2 | 6/2011 | Kusase et al. | |
| 8,067,874 B2 | 11/2011 | Kusase | |
| 2004/0100162 A1 | 5/2004 | Maeda et al. | |
| 2006/0097605 A1 | 5/2006 | Maeda et al. | |
| 2006/0202582 A1 | 9/2006 | Umesaki et al. | |
| 2006/0267344 A1 | 11/2006 | Kuribayashi et al. | |
| 2007/0267938 A1 | 11/2007 | Nishimura | |
| 2008/0048516 A1 | 2/2008 | Oowatari et al. | |
| 2008/0211337 A1 | 9/2008 | Lutz et al. | |
| 2010/0026130 A1 | 2/2010 | Kondo | |
| 2010/0109466 A1 | 5/2010 | Kondo et al. | |
| 2013/0121856 A1 | 5/2013 | Yamada et al. | |

FOREIGN PATENT DOCUMENTS

| | | |
|---|---|---|
| CN | 2870277 Y | 2/2007 |
| CN | 101969261 A | 2/2011 |
| JP | S54-116610 A | 9/1979 |
| JP | 56096163 A | 5/1985 |
| JP | H10210722 A | 8/1988 |
| JP | H01-101166 U | 7/1989 |
| JP | H04-049836 A | 2/1992 |
| JP | H04-251553 A | 9/1992 |
| JP | 5-43749 U | 6/1993 |
| JP | H06-178474 A | 6/1994 |
| JP | H06165448 A | 6/1994 |
| JP | H10201152 A | 7/1998 |
| JP | 11-98787 A | 4/1999 |
| JP | H11-136913 A | 5/1999 |
| JP | H11-275831 A | 10/1999 |
| JP | 2001-86715 A | 3/2001 |
| JP | 2004-135473 A | 4/2004 |
| JP | 2007-330025 A | 12/2007 |
| JP | 2008-236844 A | 10/2008 |
| JP | 2010-183694 A | 8/2010 |
| JP | 2010-213455 A | 9/2010 |
| JP | 2011172301 A | 9/2011 |
| JP | 2012-115085 A | 6/2012 |
| WO | WO 2012/067223 A1 | 5/2012 |

OTHER PUBLICATIONS

Japanese Office Action of JP 2012-181638 dated Jan. 14, 2016 with its English Translation.
Chinese Office Action of CN 201210440810.X dated Jan. 21, 2016 with its English Translation.
Chinese Office Action of CN 201210440834.5 dated Jan. 21, 2016 with its English Translation.
Japanese Office Action of JP 2012-181634 dated Feb. 2, 2016 with its English Translation.
Japanese Office Action of JP 2012-181636 dated Feb. 2, 2016 with its English Translation.
A Copy of the Japanese Office Action of JP 2015-075072 dated Jun. 21, 2016 along with its English Translation.

* cited by examiner

ROTOR AND MOTOR

BACKGROUND OF THE INVENTION

The present invention relates to a rotor and a motor.

A rotor of a motor may have a so-called Lundell-type construction using a permanent magnet field and including a pair of rotor cores and a field magnet (refer to, for example, Japanese Laid-Open Utility Model Publication No. 5-43749). Each of the two rotor cores includes a plurality of claw-poles arranged along a circumferential direction. The two rotor cores are joined with each other. The field magnet is arranged between the two rotor cores so that the claw-poles of the two rotor cores alternately function as different magnetic poles.

In the rotor described in Japanese Laid-Open Utility Model Publication No. 5-43749, a back magnet (auxiliary magnet in the document) is arranged between the back surface of the claw-poles (inner circumferential surface of flange in the document) and the field magnet to reduce leakage flux. Further, as shown in FIG. 3 of the document, the back magnet is annularly integrated, for example, to reduce the number of components.

In the rotor described above, the number of components is reduced by annularly integrating the back magnet. However, it is desirable that leakage flux be further suppressed.

SUMMARY OF THE INVENTION

It is an object of the present invention to provide a rotor and a motor capable of suppressing leakage flux without increasing the number of components.

One aspect of the present invention is a rotor including a first rotor core, a second rotor core, a field magnet, and a back magnet. The first rotor core includes a disk-shaped first core base and a plurality of first claw-poles arranged at equal intervals on an outer circumferential portion of the first core base. Each of the first claw-poles projects outward in a radial direction and extends in an axial direction. The second rotor core includes a disk-shaped second core base and a plurality of second claw-poles arranged at equal intervals on an outer circumferential portion of the second core base. Each of the second claw-poles projects outward in the radial direction and extends in the axial direction. Each of the second claw-poles is arranged between corresponding ones of the first claw-poles. The field magnet is arranged between the first core base and the second core base in the axial direction. The field magnet is magnetized in the axial direction so that the first claw-poles each function as a first magnetic pole and the second claw-poles each function as a second magnetic pole. The back magnet is arranged along a back surface of each of the first and second claw-poles. The back magnet is magnetized so that radially outer sections of the back magnet have polarities that are the same as the first and second magnetic poles. The back magnet is integrally formed, has an annular shape, and is in contact with all of the back surfaces of the first and second claw-poles.

A further aspect of the present invention includes a first rotor core, a second rotor core, a field magnet, and a back magnet. The first rotor core includes a disk-shaped first core base and a plurality of first claw-poles arranged at equal intervals on an outer circumferential portion of the first core base. Each of the first claw-poles projects outward in a radial direction and extends in an axial direction. The second rotor core includes a disk-shaped second core base and a plurality of second claw-poles arranged at equal intervals on an outer circumferential portion of the second core base. Each of the second claw-poles projects outward in the radial direction and extends in the axial direction. Each of the second claw-poles is arranged between corresponding ones of the first claw-poles. The field magnet is arranged between the first core base and the second core base in the axial direction. The field magnet is magnetized in the axial direction so that the first claw-poles each function as a first magnetic pole and the second claw-poles each function as a second magnetic pole. The back magnet is arranged along a back surface of each of the first and second claw-poles. The back magnet is magnetized so that radially outer sections of the back magnet have polarities that are the same as the first and second magnetic poles. The back magnet includes magnet blocks, the number of which is the same as the number of pole pairs. Each magnet block includes a first back magnet portion, arranged along the back surface of a corresponding one of the first claw-poles, and a second back magnet portion, arranged on the back surface of a corresponding one of the second claw-poles. The first back magnet portion and the second back magnet portion are adjacent in a circumferential direction and formed integrally. The first and second back magnet portions are in contact with all of the back surfaces of the first and second claw-poles.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

A first embodiment of the present invention will now be described with reference to FIGS. 1 to 6.

Figure 1:
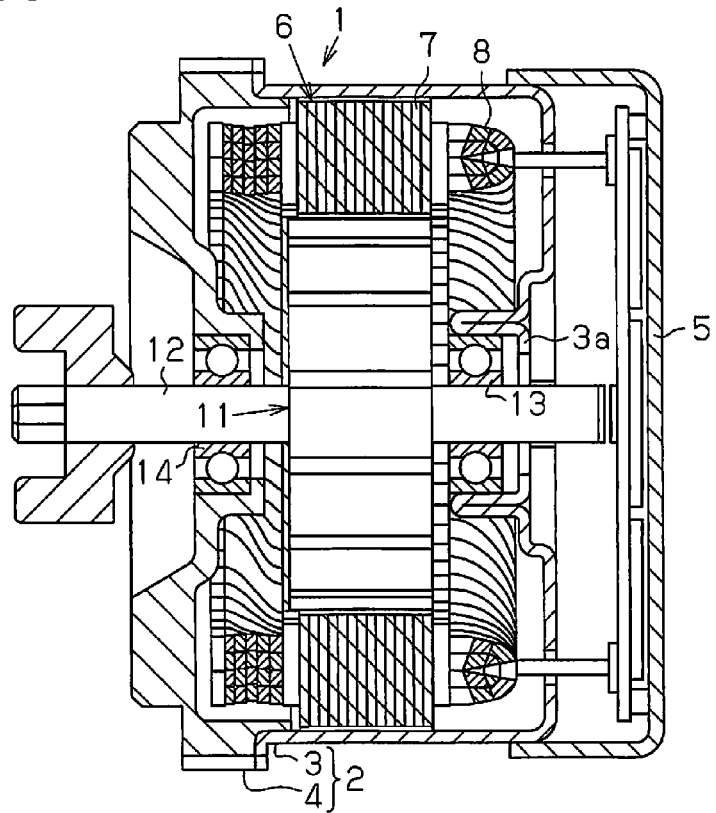
FIG. 1 is a cross-sectional view of a motor according to a first embodiment of the present invention.

As shown in FIG. 1, a motor case 2 of a motor 1 includes a tubular housing 3, which includes a closed end 3a, and a front end plate 4, which closes the open front end (left end as viewed in FIG. 1) of the tubular housing 3. A circuit accommodation box 5, which accommodates a power supply circuit of a circuit substrate and the like, is coupled to the back end (right end as viewed in FIG. 1) of the tubular housing 3. A stator 6 is fixed to an inner circumferential surface of the tubular housing 3. The stator 6 includes an armature core 7, from which teeth inwardly extend in the radial direction, and a segment conductor (SC) winding 8, which is wound around the teeth of the armature core 7. A rotor 11 of the motor 1 includes a rotation shaft 12 and is arranged inside the stator 6. The rotation shaft 12 is a non-magnetic metal shaft and supported to be rotatable by bearings 13 and 14, which are respectively arranged on the closed end 3a of the tubular housing 3 and the front end plate 4.

Figure 2:
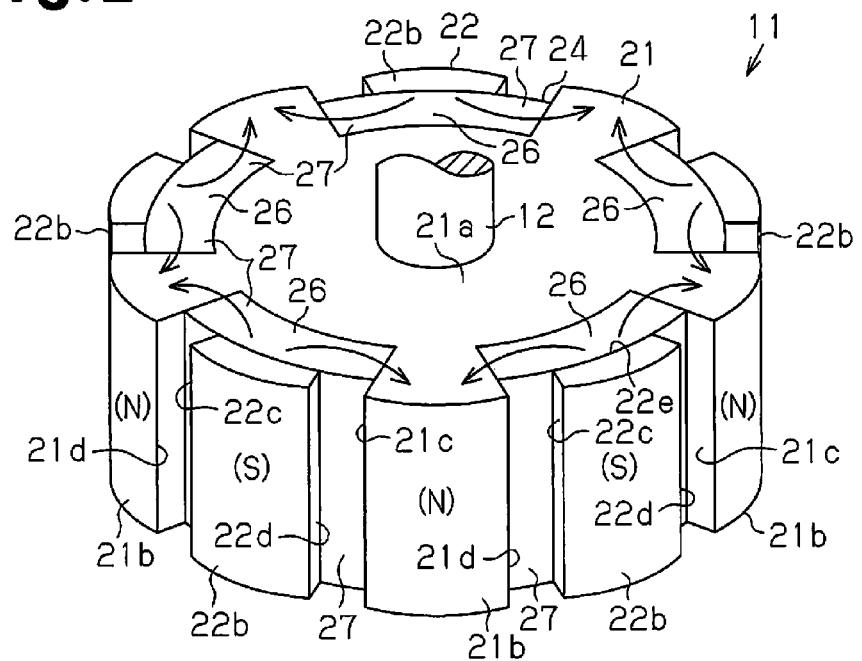
FIG. 2 is a perspective view of a rotor shown in FIG. 1.
Figure 3:
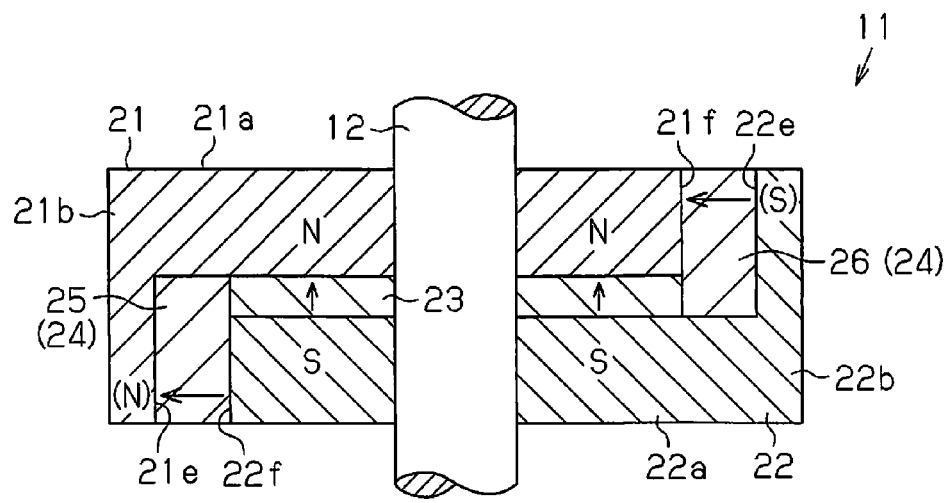
FIG. 3 is a cross-sectional view of the rotor shown in FIG. 1.

As shown in FIGS. 2 and 3, the rotor 11 includes first and second rotor cores 21 and 22, an annular magnet 23 (see FIG. 3), and a back magnet 24. The solid line arrows in FIGS. 2 and 4 indicate the magnetization direction (from S pole toward N pole) of the magnets 23 and 24.

As shown in FIGS. 2 and 3, the first rotor core 21 includes a generally disk-shaped first core base 21a and a plurality of (five in the present embodiment) first claw-poles 21b arranged at equal intervals along an outer circumferential portion of the first core base 21a. Each of the first claw-poles 21b projects outward in the radial direction and extends in the axial direction. Each first claw-pole 21b includes circumferential end faces 21c and 21d that are flat surfaces and extend in the radial direction (not inclined relative to the radial direction as viewed from the axial direction). Further, each first claw-pole 21b has a sectoral cross-section in the radial direction. The angle between the circumferential end faces 21c and 21d of each first claw-pole 21b, which is referred to as the circumferential angle, is set to be smaller than the angle of the interval between adjacent ones of the first claw-poles 21b in the circumferential direction.

As shown in FIGS. 2 and 3, the second rotor core 22, which has a shape identical to the first rotor core 21, includes a generally disk-shaped second core base 22a and a plurality of second claw-poles 22b arranged at equal intervals along an outer circumferential portion of the second core base 22a. Each of the second claw-poles 22b projects outward in the radial direction and extends in the axial direction. Each second claw-pole 22b includes circumferential end faces 22c and 22d that are flat surfaces and extend in the radial direction. Further, each second claw-pole 22b has a sectoral cross-section in the radial direction. The angle between the circumferential end faces 22c and 22d of each second claw-pole 22b, which is referred to as the circumferential angle, is set to be smaller than the angle of the interval between adjacent ones of the second claw-poles 22b in the circumferential direction. The second rotor core 22 is coupled to the first rotor core 21 so that the second claw-poles 22b are arranged between the first claw-poles 21b. The annular magnet 23 (see FIG. 4) is arranged (held) between the first core base 21a and the second core base 22a in the axial direction. In this case, the circumferential end face 21c of each first claw-pole 21b extends parallel in the axial direction to the opposing circumferential end face 22d of the adjacent second claw-pole 22b. This forms a generally straight gap extending in the axial direction between the end faces 21c and 22d. Further, the other circumferential end face 21d of each first claw-pole 21b extends parallel in the axial direction to the opposing circumferential end face 22c of the adjacent second claw-pole 22b. This forms a generally straight gap extending in the axial direction between the end faces 21d and 22c.

As shown in FIG. 3, the annular magnet 23 has the same outer diameter as the first and second core bases 21a and 22a, that is, the first and second rotor cores 21 and 22 less the claw-poles 21b and 22b. The annular magnet 23 is magnetized in the axial direction so that each first claw-poles 21b functions as a first magnetic pole (N pole in the present embodiment) and each second claw-pole 22b functions as a second magnetic pole (S pole in the present embodiment). Accordingly, the rotor 11 of the present embodiment has a so-called Lundell-type construction that uses the annular magnet 23 as a field magnet. In the rotor 11, the first claw-poles 21b, which function as the N poles, and the second claw-poles 22b, which function as the S poles, are alternately arranged in the circumferential direction. There are a total of ten magnetic poles (five pole pairs). Since the number of pole pairs is an odd number of three or greater, claw-poles of the same polarity are not arranged at opposing positions separated by 180° in the circumferential direction in each rotor cores. This provides a shape that stabilizes magnetic vibration.

Figure 4:
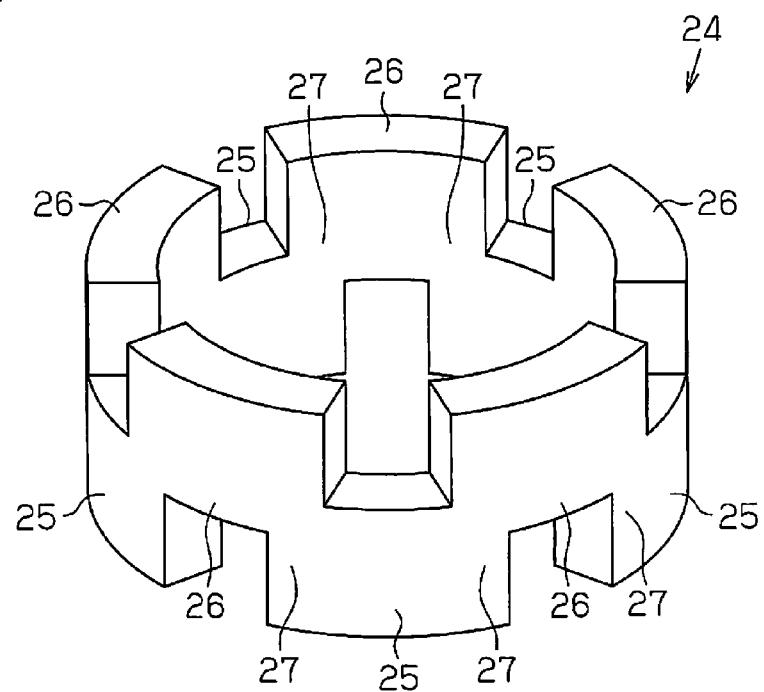
FIG. 4 is a perspective view of a back magnet shown in FIG. 2.

As shown in FIG. 4, the back magnet 24 is integrally formed with an annular shape and includes first back magnet portions 25, second back magnet portions 26, and continuous portions 27 arranged between the back magnet portions 25 and 26. The back magnet 24 does not have recesses and projections in the radial direction. Thus, the back magnet 24 has an outer surface and an inner surface in the radial direction forming true circles as viewed in the axial direction.

Referring to FIGS. 2 to 4, the first back magnet portions 25 are arranged between back surfaces 21e (radially inner surfaces) of the first claw-poles 21b and an outer circumferential surface 22f of the second core base 22a. Each first back magnet portion 25, which has a sectoral cross-section in the radial direction, and is magnetized so that the section (radially outer side) that comes into contact with the back surface 21e of the corresponding first claw-pole 21b becomes the N pole, which is the same polarity as the first claw-pole 21b, and the section that comes into contact with the outer circumferential surface 22f of the second core base 22a becomes the S pole, which is the same polarity as the second core base 22a.

The second back magnet portions 26 are arranged between back surfaces 22e (radially inner surfaces) of the second claw-poles 22b and an outer circumferential surface 21f of the first core base 21a, as shown in FIGS. 2 to 4. Each second back magnet portion 26 has a sectoral cross-section in the radial direction, and is magnetized so that the section (radially outer side) that comes into contact with the back surface 22e of the corresponding second claw-pole 22b becomes the S pole, and the section that comes into contact with the outer circumferential surface 21f of the first core base 21a becomes the N pole.

The first back magnet portions 25 and the second back magnet portions 26 each have a length in the axial direction set so that the first back magnet portions 25 and the second back magnet portions 26 extend from an axial end face of the rotor 11 to an axial position corresponding to where the annular magnet 23 is located. In other words, the first and second back magnet portions 25 and 26 have axial lengths that are substantially the same as the back surfaces 21e and 22e of the first and second claw-poles 21b and 22b. Further, the first and second back magnet portions 25 and 26 are configured so that the back surfaces 21e and 22e of the first and second claw-poles 21b and 22b entirely come into contact with the first and second back magnet portions 25 and 26 in the radial direction. As a result, when viewed from the radial direction, the back magnet 24 includes alternately arranged portions shifted back and forth toward one axial side (first back magnet portion 25) and the other axial side (second back magnet portion 26). In this manner, the back magnet 24 is zigzagged in the axial direction so that sets of a ridge and a valley, the number of which is the same as the number of pole pairs, are arranged continuously in the circumferential direction.

As shown in FIGS. 2 and 4, the continuous portions 27 extend continuously in the circumferential direction between the first back magnet portions 25 and the second back magnet portions 26. As shown in FIG. 2, the continuous portion 27 is configured to be longer than the first and second back magnet portions 25 and 26 in the axial direction and have substantially the same axial length as the first claw-poles 21b and the second claw-poles 22b.

A magnetization method of the back magnet 24 and the annular magnet 23 will now be described.

Figure 5:
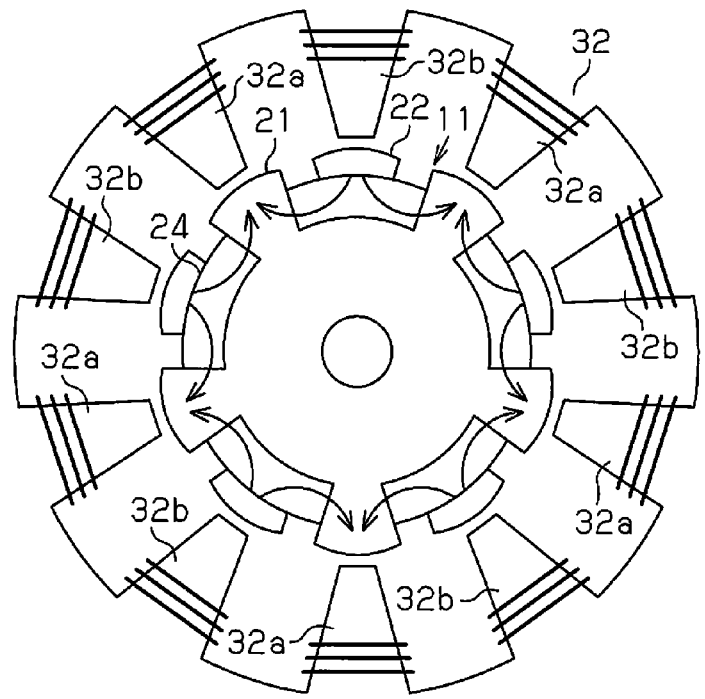
FIG. 5 is a diagram illustrating a magnetization method of the back magnet shown in FIG. 4.
Figure 6:
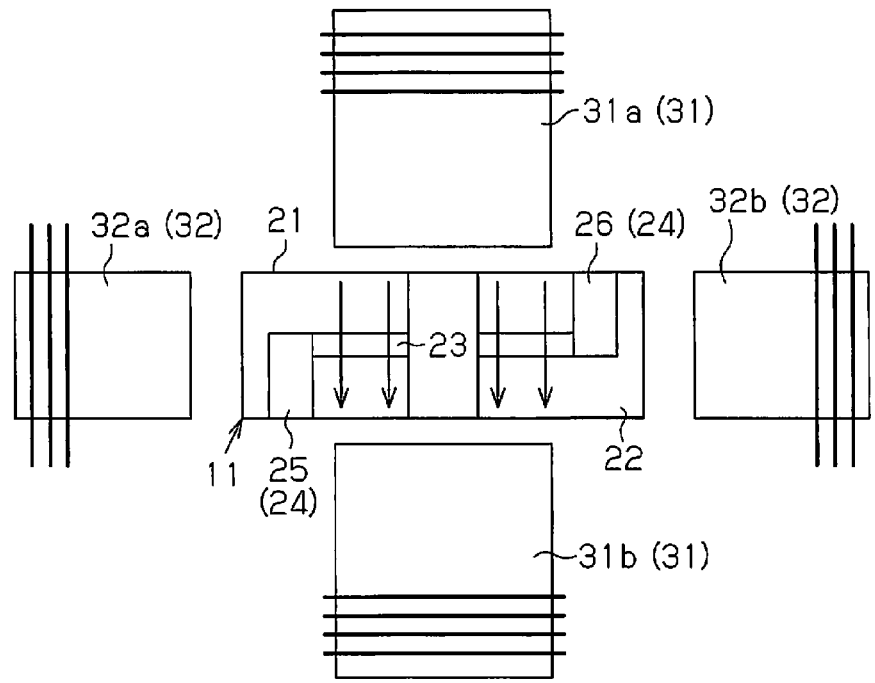
FIG. 6 is a diagram illustrating a magnetization method of an annular magnet shown in FIG. 3.

FIG. 6 shows a first magnetizing device 31 that magnetizes the annular magnet 23. The first magnetizing device 31 includes magnetizing portions 31a and 31b having different magnetic poles and respectively facing the upper and lower surfaces of the annular magnet 23 as viewed in the drawings. This magnetizes the annular magnet 23 in the thickness direction (axial direction) of the annular magnet 23. FIGS. 5 and 6 show a second magnetizing device 32 that magnetizes the back magnet 24. The second magnetizing device 32 includes magnetizing portions 32a and 32b having different magnetic poles. The magnetizing portions 32a and 32b are arranged to face the back magnet 24. The second magnetizing device 32 entirely magnetizes the back magnet 24 from an outer surface (radially outer surface) of the back magnet 24. Specifically, the back magnet 24 is magnetized to form curved magnetic fluxes extending between adjacent back magnet portions 25 and 26. In this manner, the back magnet 24 undergoes polar anisotropic orientation.

With regard to the magnetizing order of the annular magnet 23 and the back magnet 24, simultaneous magnetization of the annular magnet 23 and the back magnet 24 is advantageous in that this would reduce magnetizing steps. However, by magnetizing the annular magnet 23 and the back magnet 24 at different timings, magnetic flux interference would not occur between the annular magnet 23 and the back magnet 24. In particular, by first magnetizing the annular magnet 23, magnetization of the annular magnet 23 would be ensured. By first magnetizing the back magnet 24, magnetization of the back magnet 24 would be ensured.

The operation of the rotor 11 of the first embodiment will now be described.

The rotor 11 of the motor 1 of the first embodiment includes the back magnet 24, which is integrally formed with an annular shape. The first and second back magnet portions 25 and 26 of the back magnet 24 have the same axial length as the back surfaces 21e and 22e of the first and second claw-poles 21b and 22b. Thus, when the back magnet 24 including the first and second back magnet portions 25 and 26 is coupled to the first and second rotor cores 21 and 22, the first and second back magnet portions 25 and 26 automatically come into contact with all of the back surfaces 21e and 22e. This further suppresses leakage flux.

The first embodiment has the advantages described below.

(1) The leakage flux is suppressed by using the back magnet 24. Further, the first and second back magnet portions 25 and 26 of the back magnet 24 come into contact with all of the back surfaces 21e and 22e of the claw-poles 21b and 22b. This further suppresses generation of leakage flux. Moreover, the back magnet 24 is formed integrally with an annular shape. This decreases the number of components.

(2) The back magnet 24 is a polar anisotropic magnet and thus generates strong magnetic fluxes directed in specific directions at the claw-poles 21b and 22b. The back magnet 24 thus effectively obtains rotor torque.

(3) The back magnet 24 of the first embodiment is free from recesses and projections in the radial direction. In other words, the back magnet 24 is formed so that the radially outer surface and the radially inner surface are true circles as viewed from the axial direction. The back magnet 24 thus has a simple shape and may easily be magnetized by the magnetizing device 32.

Second Embodiment

A second embodiment of the present invention will now be described with reference to FIGS. 11 to 17. The second embodiment differs from the first embodiment in the structure of the back magnet 24. Thus, only the structure of the back magnet 24 will be described below in detail.

As shown in FIGS. 11 to 13B, the back magnet 24 includes a plurality of (five in the present embodiment) magnet blocks 29. The number of magnet block portions is the same as the number of pole pairs. Each magnet block 29 includes a first back magnet portion 25 and a second back magnet portion 26 that are integrally formed.

Figure 14:
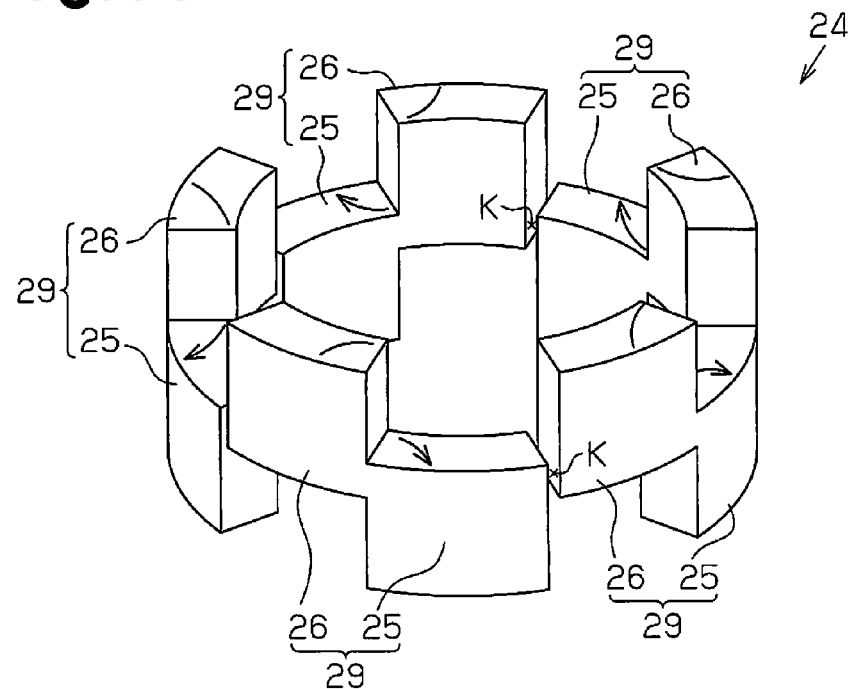
FIG. 14 is a perspective view of a back magnet shown in FIG. 11.
Figure 15:
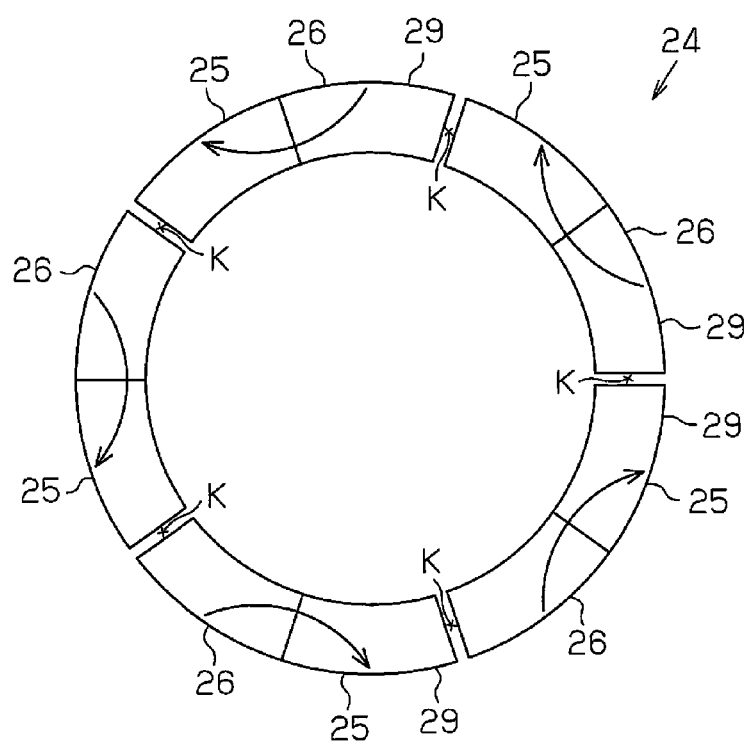
FIG. 15 is a plan view of the back magnet shown in FIG. 14.

As shown in FIGS. 14 and 15, the magnet blocks 29 are arranged in the circumferential direction with a predetermined gap K provided between one another in the circumferential direction. As shown in FIG. 15, the magnet blocks 29 are arranged so that hypothetical circles extending along the inner and outer circumferential surface of the magnet blocks 29 form substantially true circles as viewed from the axial direction.

As shown in FIGS. 11 to 13B, the first back magnet portion 25 of each magnet block 29 is arranged between the back surface 21e (radially inner side) of a first claw-pole 21b and the outer circumferential surface 22f of the second core base 22a. The first back magnet portion 25 has a sectoral cross-section in the radial direction, and is magnetized so that the section (radially outer side) that comes into contact with the back surface 21e of the first claw-pole 21b becomes the N pole, which is the same polarity as the first claw-pole 21b, and the portion that comes into contact with the outer circumferential surface 22f of the second core base 22a becomes the S pole, which is the same polarity as the second core base 22a. The first back magnet portion 25 of the second embodiment is formed to be wider in the circumferential direction that the back surface 21e of the corresponding first claw-pole 21b.

As shown in FIGS. 11 to 13A, the second back magnet portion 26 of each magnet block 29 is arranged between the back surface 22e (radially inner side) of the second claw-pole 22b and the outer circumferential surface 21f of the first core base 21a. The second back magnet portion 26 has a sectoral cross-section in the radial direction, and is magnetized so that the section (radially outer side) that comes into contact with the back surface 22e of the second claw-pole 22b becomes the S pole, and the portion that comes into contact with the outer circumferential surface 21f of the first core base 21a becomes the N pole. The second back magnet portion 26 of the second embodiment is formed to be wider in the circumferential direction than the back surface 22e of the second claw-pole 22b.

Figure 11:
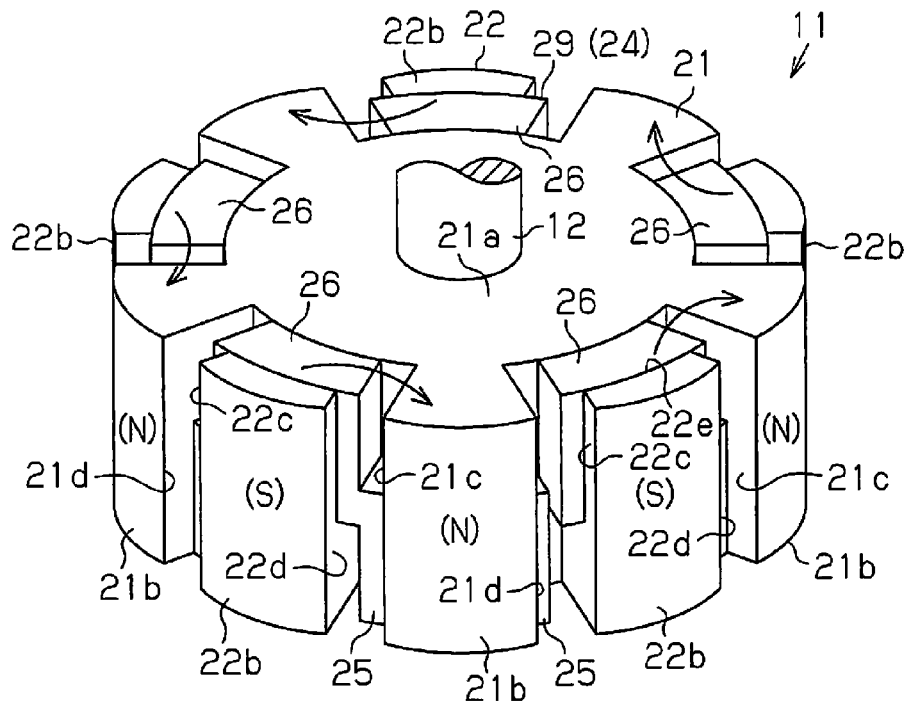
FIG. 11 is a perspective view of a rotor according to a second embodiment of the present invention.
Figure 12:
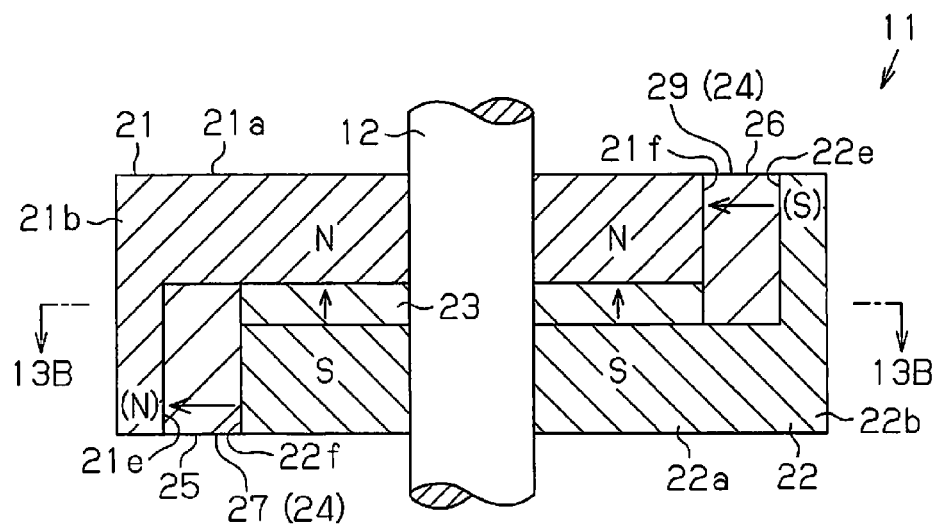
FIG. 12 is a cross-sectional view of the rotor shown in FIG. 11.
Figure 13A:
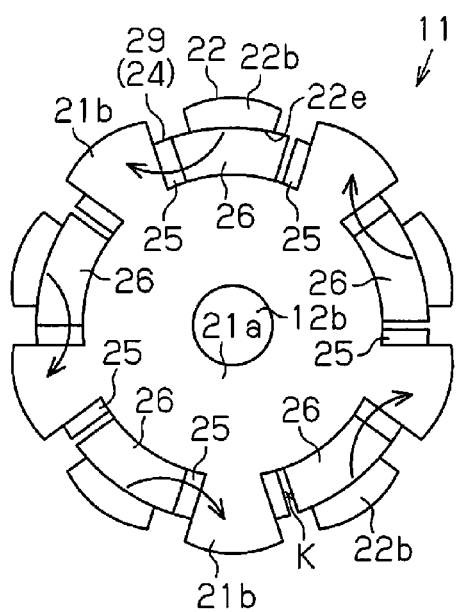
FIG. 13A is a plan view of the rotor shown in FIG. 11.
Figure 13B:
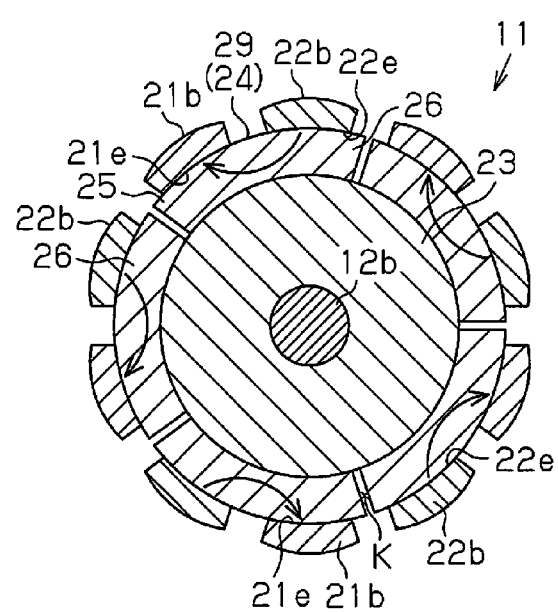
FIG. 13B is a cross-sectional view taken along line 13B-13B in FIG. 12.

Referring to FIGS. 11 and 12, the first back magnet portions 25 and the second back magnet portions 26 each have a length in the axial direction set so that the first back magnet portions 25 and the second back magnet portions 26 extend from an axial end face of the rotor 11 to an axial position corresponding to where the annular magnet 23 is located. In other words, the first and second back magnet portions 25 and 26 have axial lengths that are substantially the same as the back surfaces 21e, 22e of the first and second claw-poles 21b and 22b. Further, the first and second back magnet portions 25 and 26 are configured so that the back surfaces 21e and 22e of the first and second claw-poles 21b and 22b entirely come into contact with the first and second back magnet portions 25 and 26 in the radial direction.

The first back magnet portion 25 and the second back magnet portion 26 of each magnet block 29 have substantially the same axial length. The first back magnet portion 25 and the second back magnet portion 26 are separated from each other shifted in the axial direction. Thus, the magnet block 29 has steps when viewed from the radial direction. As a result, the arrangement of the magnet blocks 29 in the circumferential direction alternately arranges the first back magnet portions 25 and the second back magnet portions 26 in the circumferential direction with steps formed in the axial direction.

As viewed from the axial direction, the radially outer surfaces of the first back magnet portions 25 and the second back magnet portions 26 have the same curvature. Further, the radially inner surfaces of the first back magnet portions 25 and the second back magnet portions 26 have the same curvature.

Figure 16:
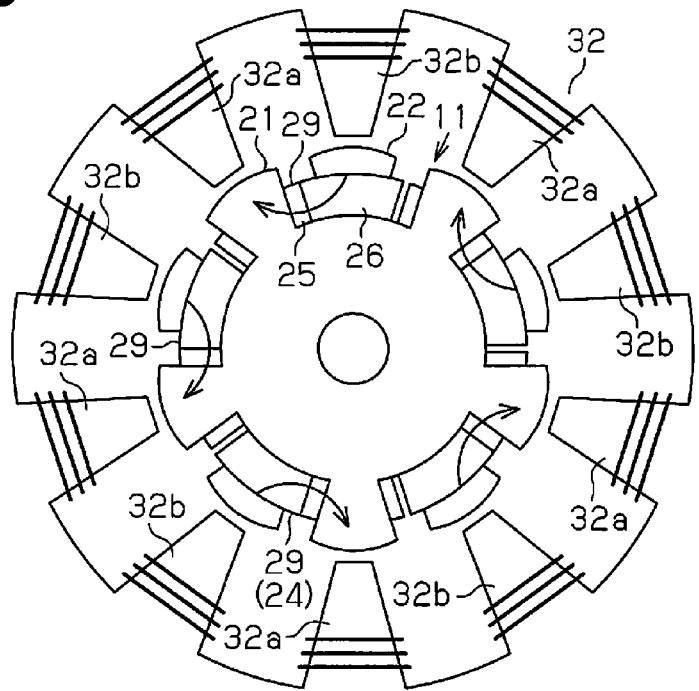
FIG. 16 is a diagram illustrating a magnetization method of the back magnet shown in FIG. 14.
Figure 17:
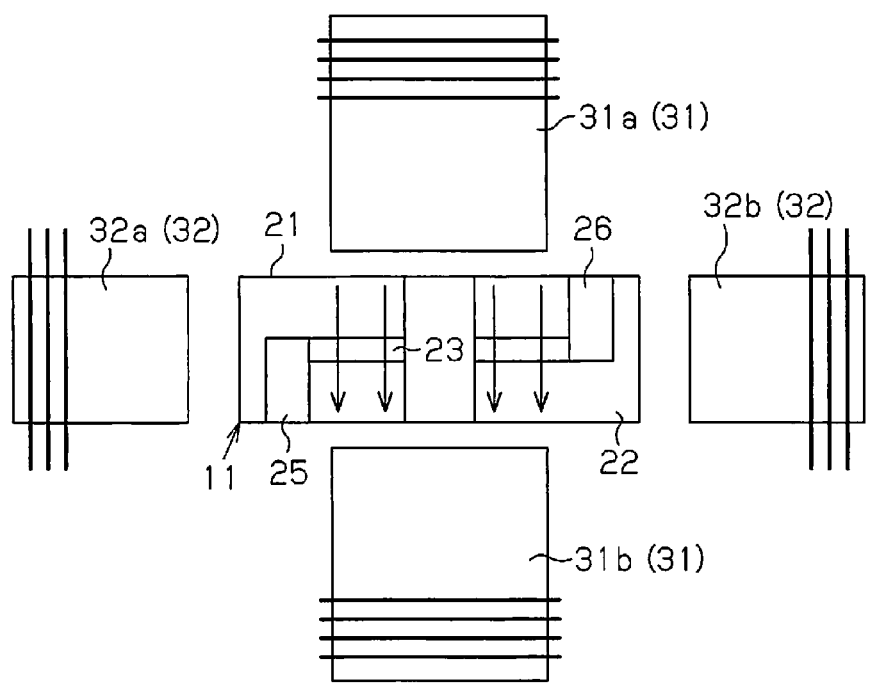
FIG. 17 is a diagram illustrating a magnetization method of an annular magnet shown in FIG. 12.

The magnetization method of the back magnet 24 and the annular magnet 23 of the second embodiment shown in FIGS. 16 and 17 is similar to the first embodiment will not be described.

The operation of the rotor 11 of the second embodiment will now be described.

The rotor 11 of the motor 1 of the second embodiment includes the back magnet 24 that is formed integrally with an annular shape. The first and second back magnet portions 25 and 26 of the back magnet 24 have the same axial lengths as the back surfaces 21e and 22e of the first and second claw-poles 21b and 22b. Thus, when the back magnet 24 including the first and second back magnet portions 25 and 26 is coupled to the first and second rotor cores 21 and 22, the first and second back magnet portions 25 and 26 automatically come into contact with all of the back surfaces 21e and 22e. This further suppressing leakage flux. Moreover, the back magnet 24 is formed by the magnet blocks 29, each including a set of the first and second back magnet portions 25 and 26. Thus, each magnet block 29 may easily be magnetized.

In addition to advantages (1) and (2) of the first embodiment, the second embodiment has the following advantage.

(4) The back magnet 24 of the second embodiment free from recesses and projections in the radial direction. Thus, the back magnet 24 is formed so that the radially outer surfaces of the first back magnet portion 25 and the second back magnet portion 26 in each magnet block 29 are arcuate and have the same curvature as viewed in the axial direction. Further, the radially inner surfaces of the first back magnet portion 25 and the second back magnet portion 26 in each magnet block 29 are arcuate and have the same curvature as viewed in the axial direction. In this manner, the magnet block 29 of the back magnet 24 has a simple shape and may easily be magnetized by the magnetizing device 32.

It should be apparent to those skilled in the art that the present invention may be embodied in many other specific forms without departing from the spirit or scope of the invention. Particularly, it should be understood that the present invention may be embodied in the following forms.

Figure 7:
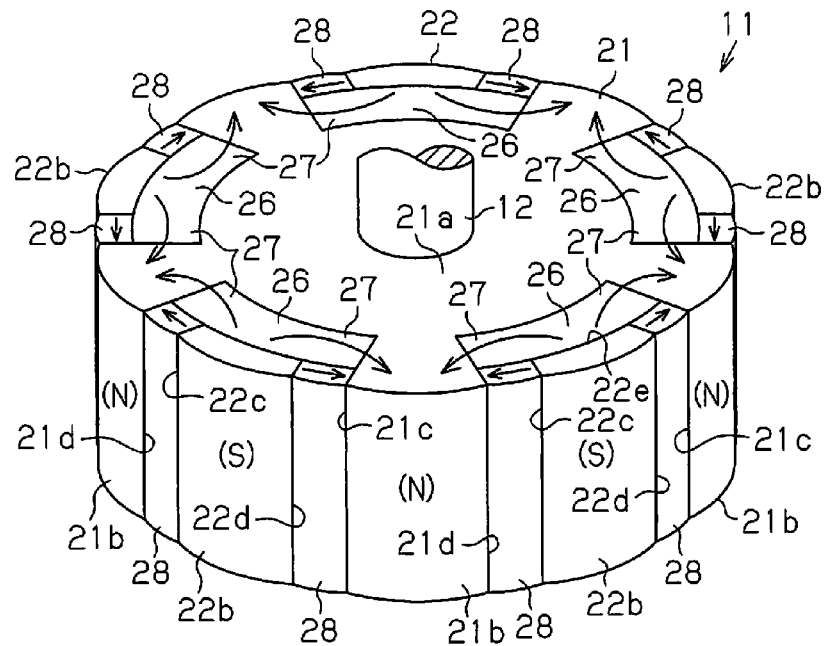
FIG. 7 is a perspective view showing another example of a rotor.
Figure 8:
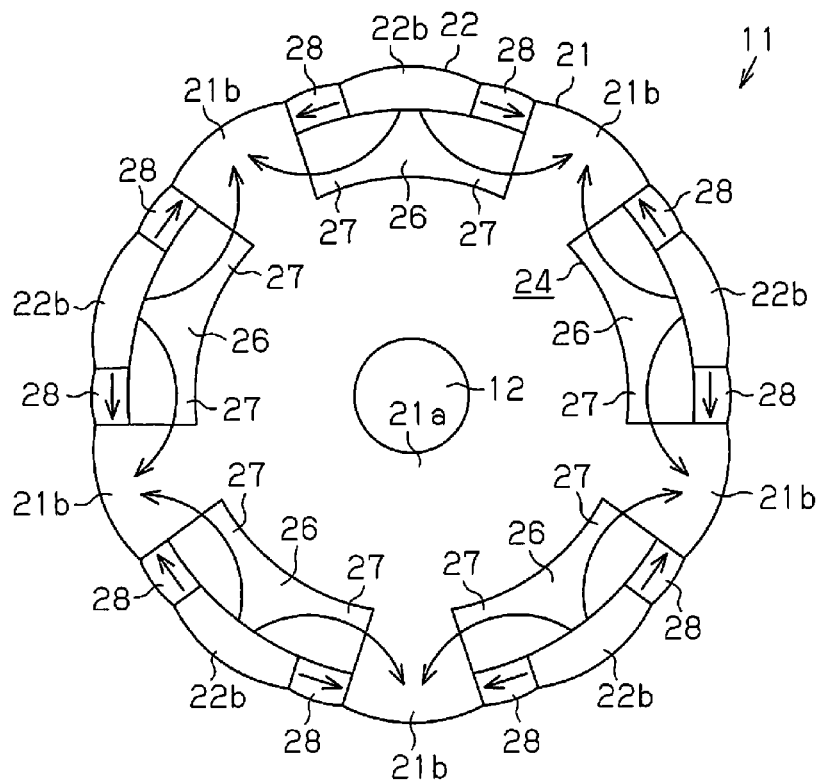
FIG. 8 is a plan view of the rotor shown in FIG. 7.
Figure 9:
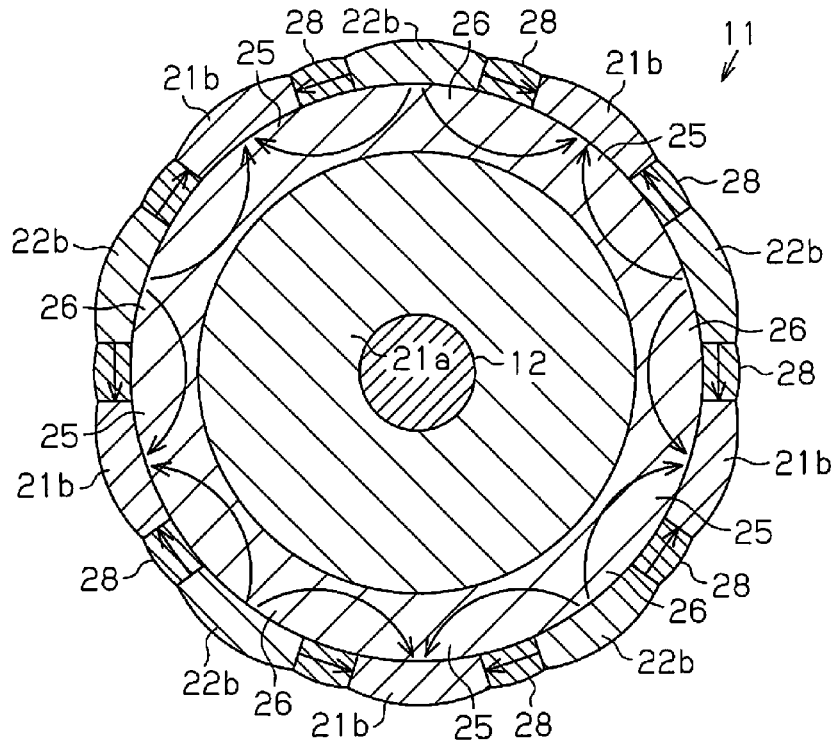
FIG. 9 is a cross-sectional view of the rotor shown in FIG. 7 taken by cutting the rotor in the radial direction at an axially central section of the rotor.

Referring to FIGS. 7 to 9, in the first embodiment, inter-pole magnets 28 may be arranged between adjacent ones of the first claw-poles 21b and the second claw-poles 22b in the circumferential direction. The inter-pole magnets 28 are magnetized in the circumferential direction so that sections of the same polarity face each other between the inter-pole magnets 28 and the first and second claw-poles 21b and 22b. Thus, the section of each inter-pole magnet 28 located closer to the first claw-pole 21b functions as the N pole, and the section of each inter-pole magnet 28 located closer to the second claw-pole 22b functions as the S pole. This structure suppresses the generation of leakage flux between the claw-poles.

The second embodiment may also include inter-pole magnets arranged between the first claw-poles 21b and the second claw-poles 22b in the circumferential direction (not shown). This structure also suppresses the generation of leakage flux between the claw-poles.

Figure 10:
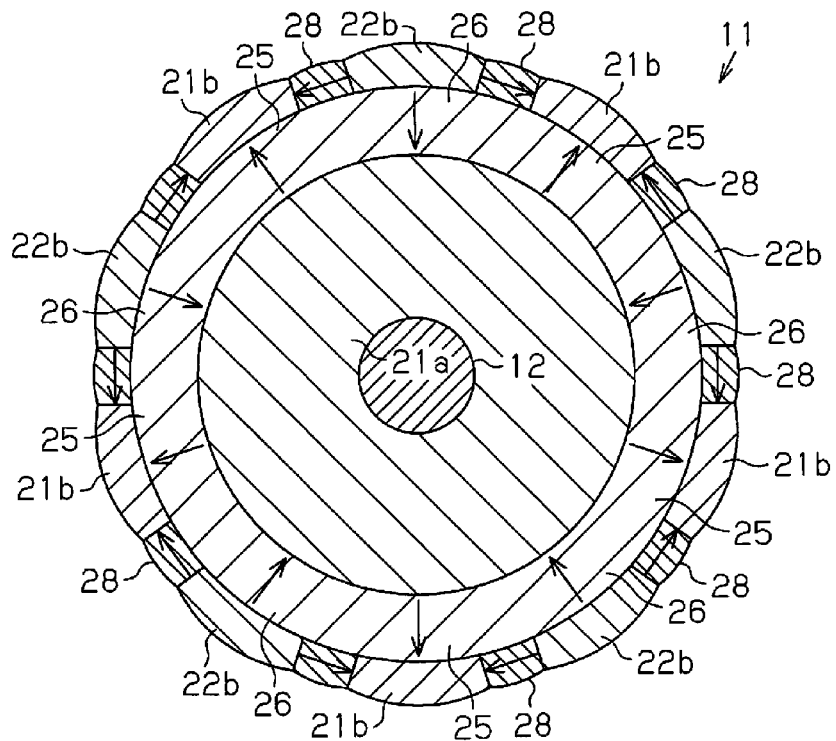
FIG. 10 is a cross-sectional view of a rotor according to another example.
Figure 18:
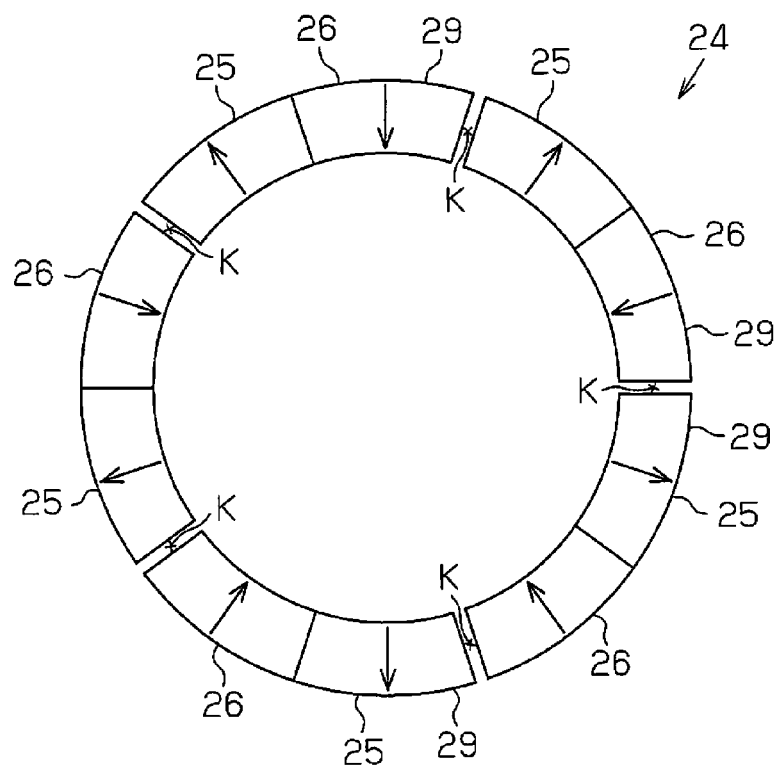
FIG. 18 is a plan view of a back magnet according to another example.

In the first and second embodiments, the back magnet 24 is configured by the polar anisotropic magnet but may be formed by a different type of anisotropic magnet. Further referring to FIGS. 10 and 18, the first back magnet portions 25 and the second back magnet portions 26 of the back magnet 24 may be magnetized in the radial direction.

The back magnet 24 may be formed by, for example, a sintered magnet or a bond magnet (plastic magnet, rubber magnet, or the like). This allows for the back magnet 24 to be formed through, for example, either one of compression molding and injection molding and allows for different manufacturing processes. Further, the back magnet 24 may be manufactured using a versatile material such as ferrite magnet, SmFeN magnet, SmCo magnet, neodymium magnet, and the like. Moreover, any of various types of magnets may be used as the inter-pole magnet 28.

In the first and second embodiments, a single annular magnet 23 is used as the field magnet. Instead, a permanent magnet may be divided into segments that are arranged between the first and second core bases 21a and 22a in the axial direction around the rotation shaft 12.

In the first and second embodiments, the first and second rotor cores 21 and 22 and the armature core 7 may be formed, for example, by stacking magnetic metal plates or molding a magnetic powder.

In the first and second embodiments, coils may be wound around the teeth of the stator 6 in a concentrated winding or a distributed winding.

The present examples and embodiments are to be considered as illustrative and not restrictive, and the invention is not to be limited to the details given herein, but may be modified within the scope and equivalence of the appended claims.

The invention claimed is:

1. A rotor comprising:
   a first rotor core including a disk-shaped first core base and a plurality of first claw-poles arranged at equal intervals on an outer circumferential portion of the first core base, wherein each of the first claw-poles projects outward in a radial direction and extends in an axial direction;
   a second rotor core including a disk-shaped second core base and a plurality of second claw-poles arranged at equal intervals on an outer circumferential portion of the second core base, wherein each of the second claw-poles projects outward in the radial direction and extends in the axial direction, and each of the second claw-poles is arranged between corresponding ones of the first claw-poles;
   a field magnet arranged between the first core base and the second core base in the axial direction, wherein the field magnet is magnetized in the axial direction so that the first claw-poles each function as a first magnetic pole and the second claw-poles each function as a second magnetic pole; and
   a back magnet arranged along a back surface of each of the first and second claw-poles, wherein the back magnet is magnetized so that radially outer sections of the back magnet have polarities that are the same as the first and second magnetic poles, wherein
   the back magnet is integrally formed, has an annular shape, and is in contact with all of the back surfaces of the first and second claw-poles,
   the back magnet includes first and second back magnet portions respectively arranged on the back surfaces of the first and second claw-poles that are adjacent to each other in a circumferential direction, and
   the first and second back magnet portions are shifted to each other in the axial direction and alternately arranged along the circumferential direction so that the back magnet includes a ridge and a valley as viewed in the radial direction.

2. The rotor according to claim 1, wherein the back magnet includes a radially inner surface and a radially outer surface forming true circles as viewed in the axial direction.

3. The rotor according to claim 1, further comprising an inter-pole magnet arranged between the first and second claw-poles,
   wherein the inter-pole magnet is magnetized to have the same polarities as the opposing first and second claw-poles.

4. The rotor according to claim 1, wherein the back magnet is a polar anisotropic magnet.

5. A motor comprising the rotor according to claim 1.